(12) United States Patent
Nieraad et al.

(10) Patent No.: US 10,874,238 B2
(45) Date of Patent: Dec. 29, 2020

(54) DISPENSING SYSTEM

(71) Applicant: Rastal GmbH & Co. KG, Hohr-Grenzhausen (DE)

(72) Inventors: Thomas Nieraad, Hofheim (DE); Carsten Kehrein, Koblenz (DE)

(73) Assignee: RASTAL GMBH & CO. KG, Hohr-Grenzhausen (DE)

( * ) Notice: Subject to any disclaimer, the term of this patent is extended or adjusted under 35 U.S.C. 154(b) by 14 days.

(21) Appl. No.: 16/085,658

(22) PCT Filed: Apr. 18, 2017

(86) PCT No.: PCT/EP2017/059208
§ 371 (c)(1),
(2) Date: Dec. 26, 2018

(87) PCT Pub. No.: WO2017/182481
PCT Pub. Date: Oct. 26, 2017

(65) Prior Publication Data
US 2019/0380521 A1 Dec. 19, 2019

(30) Foreign Application Priority Data
Apr. 19, 2016 (DE) .................. 20 2016 102 048 U
Nov. 1, 2016 (DE) .................. 10 2016 120 792

(51) Int. Cl.
*A47G 23/16* (2006.01)
*G06Q 10/08* (2012.01)
(Continued)

(52) U.S. Cl.
CPC ........... *A47G 23/16* (2013.01); *G06Q 10/087* (2013.01); *G07F 7/0609* (2013.01); *G07F 13/04* (2013.01); *B65D 2203/10* (2013.01)

(58) Field of Classification Search
CPC ....... A47G 23/16; G07F 13/04; G07F 7/0609; G07F 13/00; G06Q 10/087; B65D 2203/10
(Continued)

(56) References Cited

U.S. PATENT DOCUMENTS 5,704,144 A * 1/1998 Groth ..................... G09F 3/10
40/306
6,718,343 B2 * 4/2004 Kamata ................ G06Q 10/087
(Continued)

FOREIGN PATENT DOCUMENTS

DE 10109435 A1 1/2002
DE 10261442 A1 7/2004
(Continued)

OTHER PUBLICATIONS

Nora Lindner, International Preliminary Report on Patentability, PCT/EP2017/059208, World Intellectual Property Organization, dated Nov. 1, 2018.
(Continued)

Primary Examiner — Nam V Nguyen
(74) Attorney, Agent, or Firm — Paul & Paul

(57) ABSTRACT

The present invention relates to a system consisting of
a) a plurality of containers having an information label which contains a unique and distinct container identification that can be read out,
b) a first read device for reading out container identifications from information labels and for generating a data string on the basis of the read out container identification,
c) a database (4) for storing the data string in a database entry and
d) a control device which initiates the transmission of the generated data string to the database (4).

21 Claims, 1 Drawing Sheet

(51) Int. Cl.
*G07F 7/06* (2006.01)
*G07F 13/04* (2006.01)

(58) Field of Classification Search
USPC .............. 340/10.1–10.5, 5.92, 572.1, 12.51; 235/385
See application file for complete search history.

(56) References Cited

U.S. PATENT DOCUMENTS

| | | | |
|---|---|---|---|
| 7,885,852 B2* | 2/2011 | Banerjee | G06Q 20/202 705/14.1 |
| 8,267,326 B2* | 9/2012 | Kolton | B65D 23/14 235/492 |
| 9,092,999 B1* | 7/2015 | Harruff | G09F 3/10 |
| 10,089,824 B2* | 10/2018 | Yamaguchi | A63F 3/00157 |
| 10,373,276 B2* | 8/2019 | Carpenter | G06Q 30/0185 |
| 2006/0032917 A1 | 2/2006 | Ritter | |
| 2008/0114490 A1* | 5/2008 | Jean-Pierre | G06F 19/3462 700/241 |
| 2008/0195251 A1* | 8/2008 | Milner | B67D 3/0035 700/237 |
| 2010/0167704 A1* | 7/2010 | Villemaire | H04M 3/4878 455/414.1 |
| 2010/0200110 A1 | 8/2010 | Sigiet et al. | |
| 2011/0264285 A1* | 10/2011 | Mattos, Jr. | B67D 1/0888 700/283 |
| 2016/0092851 A1 | 3/2016 | De Berg Hewett | |
| 2019/0035497 A1* | 1/2019 | Kolberg | A61B 5/00 |

FOREIGN PATENT DOCUMENTS

| | | |
|---|---|---|
| DE | 102005003348 A1 | 8/2006 |
| DE | 102013000587 A1 | 12/2013 |
| EP | 0856812 A2 | 5/1998 |
| EP | 1628242 A1 | 2/2006 |
| EP | 2368645 A1 | 9/2011 |
| JP | H08202806 A | 8/1996 |
| KR | 20150103550 A | 9/2015 |
| WO | 2014188389 A1 | 11/2014 |

OTHER PUBLICATIONS

European Search Report, dated Nov. 25, 2019, European Application No. EP 17 717 744.1.

* cited by examiner

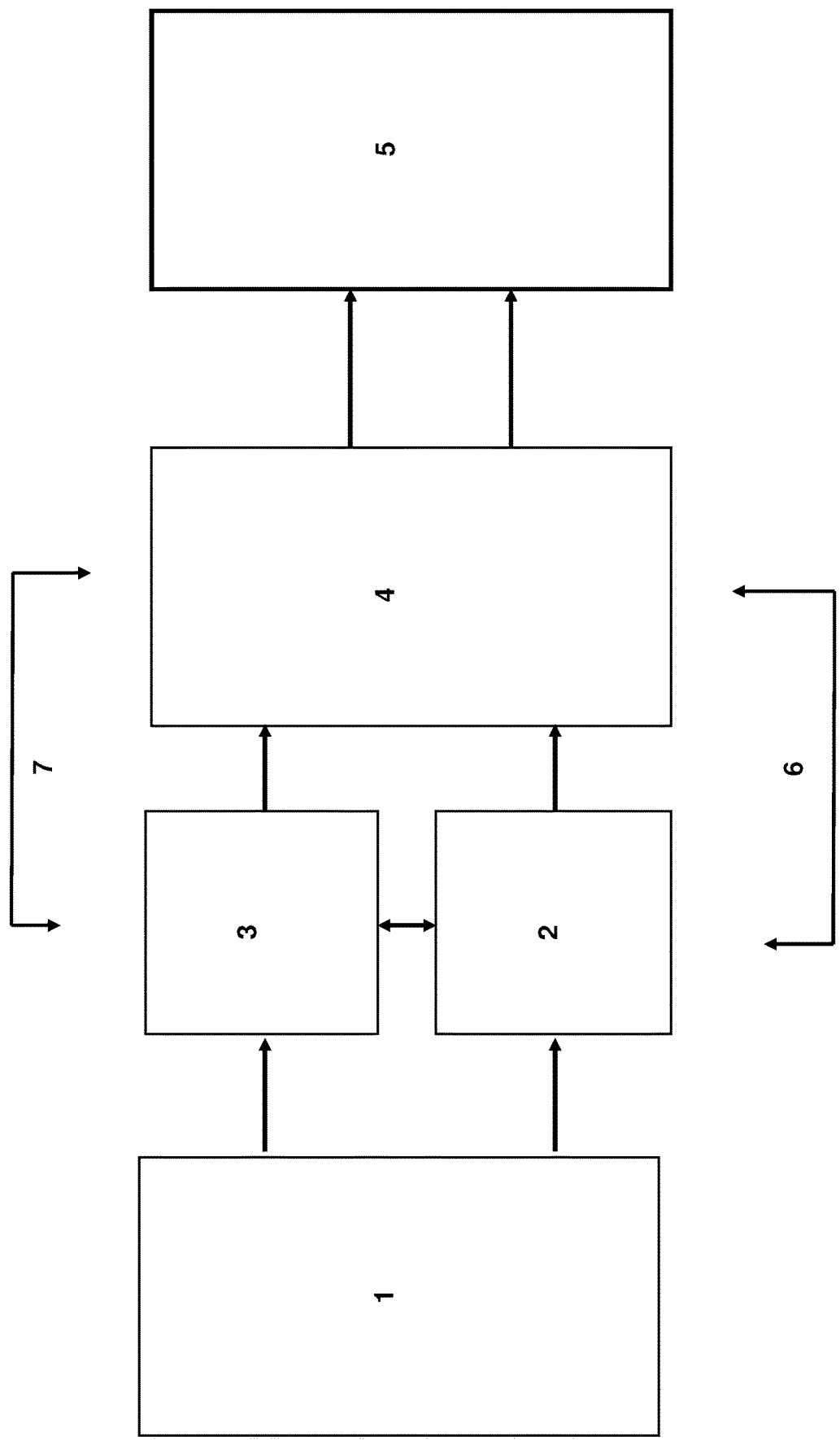

DISPENSING SYSTEM

CROSS-REFERENCE TO RELATED APPLICATIONS

This application is a 371 national stage application of International Application PCT/EP2017/059208, filed Apr. 18, 2017, and claims the priority of German Applications No. 10 2016 120 792.6, filed on Nov. 1, 2016, and No. 20 2016 102 048.4, filed on Apr. 19, 2016.

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable

STATEMENT REGARDING PRIOR DISCLOSURES BY THE INVENTOR OR A JOINT INVENTOR

Not applicable

BACKGROUND OF THE INVENTION

Field of the Invention

The present invention concerns a dispensing system.

Description of Related Art

A large number of different drinks are usually offered, sold and consumed by customers in bars, cafes, restaurants but also at drinks stands. In that respect the customer places an order with a waiter or waitress or the barkeeper, whereupon a container like for example a drinking glass is filled with the ordered drink and handed over the to the customer. That is generally followed by payment. That can occur for example immediately after the drink has been delivered or at the end of a stay.

In particular at drinks stands a deposit is additionally to be provided for having use of the container on a loan basis. In addition the value of the deposit is usually not established by the bar operator and can exceed the value of the container so that there is the danger that customers hand in to the bar operator containers which were acquired elsewhere and ask for repayment of the deposit. To prevent that deposit tokens are frequently given out with each container, and such tokens have to be returned by the customer together with the container in order to be able to request repayment of the deposit.

The payment operation and in particular taking in and paying out the deposit money including deposit token management are very time-consuming and laborious.

Containers like for example drinking glasses generally have only a limited life. Thus many containers are designed for 250 rinsing operations. After that drinking glasses frequently become unsightly and in the worst-case scenario can break and have sharp edges. It is therefore important for the containers to be regularly replaced. As however it is generally not possible to determine the number of rinsing operations per glass, replacement of the containers frequently happens too early or too late. In addition the glass manufacturer not infrequently guarantees a minimum durability which is specified in terms of rinsing operations. In the case of a drinking glass which is worn however it is scarcely still possible to establish, both from the point of view of the bar operator and also from the point of view of the glass manufacturer how many rinsing operations that drinking glass has already undergone. On the part of the glass manufacturer that can lead to reduced readiness to observe a guarantee while on the part of the bar operator this can lead to claiming unjustified guarantees.

Not infrequently bar operators conclude contracts with breweries, which involve a not inconsiderable participation on the part of the brewery in setting up the dispensing system and also a time obligation on the part of the bar operator to exclusively take drinks from the brewery at previously set prices.

A fraudulent bar operator could be eager to obtain at least some of the drinks at a better price from a third party. The brewery—rightly or wrongly—could suspect the bar operator of such fraud.

In addition there is the risk that the fraudulent bar operator does not properly account for all the drinks sold. Therefore revenue offices in the case of extraordinarily high bar losses have already gone over to estimating turnover figures and correspondingly calculating the taxes therefrom. The honest bar operator is generally not in a position to demonstrate that in actual fact he only achieved a lower turnover than the revenue offices estimated.

In addition it can repeatedly occur that bar operators wrongly estimate the probable drinks consumption so that the corresponding drinks stocks created are too great or too small. Incorrect stock keeping also means that in the case of drinks wholesalers and possibly even breweries bottlenecks or overproduction occurs if the consumption levels are unexpectedly markedly above or below the predicted levels.

BRIEF SUMMARY OF THE INVENTION

The containers being considered here are not only drinks containers but for example also bottles, drinks cans, plates, bowls or pots. If hereinafter the invention is described by reference to drinks containers and drinks that is only for the sake of greater ease of description. Basically the present invention also embraces systems for dispensing meals like for example tapas or sushi or system for dispensing meals and drinks.

A container in accordance with the present invention is a container irrespective of the choice of its material. In that respect the material of the container can be selected from a group consisting of glass, ceramic, metal, stainless steel and plastic or a combination thereof.

Drinks containers in accordance with the present application include beakers, particles with handles like mugs, cups and pitchers, stem containers but also bottles or drinks bottles. Preferably in that respect a drinks container is made of glass.

Taking the above-described systems as the basic starting point therefore the object of the present invention is to provide a dispensing system which makes it possible to overcome or at least attenuate some of the stated disadvantages.

According to the invention that object is attained by a dispensing system comprising:

a) a plurality of containers having an information carrier which contains a unique and distinct container identification which can be read out, b) a first reading device for reading out container identifications from information carriers and for generating a data string on the basis of the read-out container identification, c) a database for storing the data string in a database entry, and d) a control device which causes transmission of the generated data string to the database.

In principle the information carriers can be of any desired configuration. Thus for example barcodes, QR codes and colour codes are conceivable.

Alternatively they could also be RFID tags or NFC tags based thereon. In that case the reading device must be so adapted that it is capable of reading out corresponding RFID tags and NFC tags. NFC stands for "near field communication" and is an international transmission standard based on RFID technology for contactless exchange of data by radio over short distances of a few centimetres. The use of NFC tags has the advantage that the reading-out range of the reading device actually only reaches a few centimetres so that it is simple for the reading device or the reading unit to read out the desired information carrier even if further information carriers are in the immediate proximity, as is frequently the case in bars.

At least one unique and distinct container indentation is stored on the information carrier. That can be for example a corresponding ID number which is separately allocated for each container so that the same container identification is not associated with a plurality of containers. Each container identification is therefore assigned only one single time.

In addition further items of information like for example the capacity of the container and the nature of the drink for which the container is intended can be stored on and can be read from the information carrier.

The described system can be used for example in such a way that any beer glass which is provided with a corresponding information carrier is read out after filling by the reading device.

If a data string is entered in the database for each reading-out operation it is then possible on the basis of the number of data entries to establish how many beers have been sold.

The reading device can be for example integrated into the surface of a counter so that the corresponding container simply has to be put down for a moment at the corresponding position on the counter. For that purpose the reading device has a flat surface.

The reading device can also include a weighing device, by means of which the weight of the container which is put down on the reading device can be detected. As the empty weight of the container is known it is possible to draw conclusions about the filling volume by means of weight measurement.

So that it is possible to see at what location the reading device is positioned in the counter the counter surface can have a suitable marking which marks the reading region of the reading device. That marking can be for example a light marking like an LED light, wherein the best is that the light marking temporarily changes the colour of the light after a successful reading-out operation. In that way it is possible to optically note that the reading-out operation was successful and the glass can be removed again.

Alternatively the first reading device can also be integrated into a tablet which is used by the corresponding serving staff member to distribute the ordered drinks to the tables which are possibly present in the bar or in the restaurant.

A further possibility involves integrating the reading device directly into the table surface at which the customers sit. In that case reading devices have to be provided in all customer tables.

A further alternative involves arranging the reading device at a container return station at which the emptied containers are collected before they are cleaned again. In that case detection of the containers occurs only at the moment at which they are given back.

In a further preferred embodiment there is provided a second reading device for reading out information carriers and for generating a data string on the basis of the read-out information.

Thus for example it would be possible to install a first reading device for dispensing of the drinks and a second reading device in regard to the return of glasses. In that case it is advantageous if both the first reading device and also the second reading device are such that they attach an item of status information to the data string, wherein the status information has the same status for all data strings generated by a reading device, wherein the status of the status information generated by the second reading device differs from the status of the status information generated by the first reading device.

Thus for example the first reading device which is arranged in the bar counter, the tablet or the customer table could be associated with the status "dispensed", which signifies that that container has been dispensed with the corresponding drink. The second reading device which is then disposed at the return station could assign the status "return". On the basis of the status it can then be established at any time whether a given container is just with a customer or has already been returned, that is to say it still has to be rinsed or is already on the shelf for use at the next order for a drink.

Alternatively three reading devices are also conceivable, which for example are integrated in the bar counter/tablet, in the customer table and at the tableware return. In that case the status is "ready", "dispensed" and "return".

In that respect, a single database entry can be effected for each container identification so that, upon detection by the first or the second reading device, only the status information which is part of the database entry is corrected.

If the same container identification is detected afresh by the first reading device after return has occurred then a further database entry can be implemented. Alternatively the database entry can have a data field "number", the value of which is increased by one at the renewed detection.

In a preferred embodiment it is provided that the control device is so adapted that it stores the generated data string in the database only when there is no database entry having the same container identification and the same status.

That measures prevents the same container being erroneously detected twice in succession by the first reading device without in the meantime consumption of the drink contained therein having occurred. It is therefore necessary that each container is always detected alternately at the first reading device and at the second reading device, wherein only detection at the first reading device signifies that a drink has been dispensed while detection at the second reading device signifies that the drink has been consumed and the container is ready for cleaning and re-use.

In a further preferred embodiment it is provided that the first reading device and/or the database is or can be connected to a till system in order to transmit the data string to the till system. Modern till systems provide that an account entry is already generated for each ordered drink when the order is placed. Frequently orders are in the meantime communicated by radio to a digital till system to which the barkeeper has access and can see what drinks have been ordered and have not yet been prepared. The barkeeper then has to input any prepared drink in the till system in order to notify to the till that the drink has been prepared, whereupon it is removed from the list of the drinks which are still to be prepared.

By virtue of the first reading device or the database being linked to the till system it is now possible for drinks which have already been produced to be transferred from the order status into the dispensed status in the till system when the corresponding drink or the drinking glass or container used is detected at the first reading device. If for example a beer and a coffee are ordered at a customer table then the barkeeper can call up that order in the till system. If thereafter a beer or a coffee is detected at the first reading device that is taken from the order and noted as prepared. The barkeeper thus always has his eye on which drinks of that order still have to be prepared.

In a preferred embodiment when recording the order by means of the till system a database entry is made in a database, which contains a given status value characterising that here something has been ordered but not yet prepared. That database can either be a database which is associated with the till system or it can be the database to which the reading device transmits the data string.

The barkeeper can look at the open orders, select one thereof, prepare the ordered drink and detect the container with the prepared drink with the first reading device. In that case the database entry of the open order can then be supplemented by the container identification and the status value altered (for example from "ordered" to "prepared" or "dispensed").

In a preferred embodiment the database is arranged remote from the first reading device, wherein the database and the first reading device are connected together by way of a data link. The data link is preferably wireless and best is in the form of a mobile radio link. A wireless link permits a high degree of flexibility in the arrangement of the database. Basically a link by way of WLAN or Bluetooth would be conceivable. In that respect the link by way of WLAN would also have the advantage that the reading device and the database could be connected over the Internet so that the database can be arranged at a completely remote location, like for example a server farm of a hardware lender. It will be noted however that the availability of the communication link between the database and the reading device depends on the strength and the traffic load on the WLAN link. Therefore a mobile radio link is particularly preferred as that link occurs independently of the loading on the locally present WLAN.

In a further preferred embodiment it is provided that the first and/or second reading device generates a data string containing items of information about the location of the reading device. That is particularly advantageous if many reading devices in different bars or restaurants are connected to the database. That information can be for example the number of the SIM card if it is ensured that it is possible to have access to an association between the SIM number and the location. Alternatively or in combination the reading device can also have a GPS receiver, by means of which the current position coordinates can be detected.

In a further preferred embodiment there is provided a computer program which can be loaded on to a smartphone and which when run on a smartphone can read identifications out of information carriers, wherein preferably the computer program produces a link to the database and transmits the data released by the user of the smartphone to the database.

In that way the customer, when using the computer program, hereinafter also referred to as the app, can independently read in the information carrier. The computer program then links the container identification to the identification of the smartphone. If, for reasons of data protection law, it is permissible and appropriate the app can transmit to the database further data which are released by the user of the smartphone, like for example information about the gender or age of the user. In that way the bar or the drinks manufacturer acquires additional information about the customer consuming the drink.

In order to motivate the customers to use the corresponding app for example competitions which are linked to the container identification can be offered and promoted. For example it would be possible for the drinks manufacturer or the bar system operator to raffle suitable prizes at regular intervals, in which case the corresponding ticket numbers could be identical to the identifications of the drinking glasses.

Furthermore in a preferred embodiment there is provided a customer reading device for reading in customer identifications. Besides biometric methods, identity cards, credit cards, customer cards or smartphones can also be implemented as the customer identifications. Particularly preferably the customer reading device is a device for reading out RFID tags or NFC chips. Such NFC chips are in the meantime included in almost every smartphone but also in credit cards or in personal identity cards. That NFC chip can be used for cashless payment or for identification. Thus for example at each order the customer can present his corresponding NFC chip so that the order is linked to the NFC chip or the customer identification linked thereto.

The corresponding price for the ordered drink is either put immediately on the credit card or the NFC chip only serves to call up the corresponding daily account at the end of the visit to the bar.

In a further preferred embodiment there is provided a deposit management system which provides that both a container identification is read out with the first reading device and also a customer identification is read out with the customer reading device, a database entry is generated which associates the deposit allocated to the identified container with the customer identification and, as soon as the second reading device thereafter reads out the same container identification, the association between the customer identification and the deposit allocated to the identified container is extinguished.

In other words the deposit for the container is linked to the customer identification, that is to say the personal NFC chip of the customer. When the corresponding glass is returned it is detected by the second reading device and automatically credited to the correct customer. The complicated and laborious procedure of paying out small deposit amounts and possibly the additional issue and return of deposit tokens is eliminated. That can greatly simplify the work involved for example in relation to large events in which a very large number of orders or deposit returns have to be organised in a short time in particular during the intervals and at the end of the event.

In a further preferred embodiment there is provided a use management system which associates with each detected container identification a value which is calculated on the basis of the number of detections of said container identification by the first reading device and possibly on the basis of further data, and files it in the database.

With that measure it is possible in a simple fashion to establish which container has reached its planned service life as the number of rinsing operations is detected. Besides the number of rinsing operations the duration of use can also play a part.

For example the second reading device which is installed at the container return station can have a corresponding display device which displays a warning when a container is returned, which has reached its intended service life. The corresponding container can then be removed directly from the circuit and possibly recycled.

In a further preferred embodiment there is provided a time detection system which detects the time which has elapsed between the detection of the same container identification by two different reading devices and files that time or a value calculated from that time in the database.

If the system for example has two reading devices, wherein one is linked to production of the drink while the other is linked to glass returns, the time which occurs between the two detections substantially corresponds to the consumption time that the user requires for that drink. The consumption time measured in that way can be added as a further criterion in establishing the prices of the drinks as usually the price of the drinks must not only cover the costs of providing the drink to be consumed but also costs involved in providing the premises, the seating, the sanitary equipment, the container and the waiting staff.

In a further preferred embodiment there is provided a quantity detection system which determines the number of detections of container identifications and files the determined number possibly with further data in the database.

It is thus possible to see in real time, what quantities of drinks have been consumed.

In a preferred embodiment the database contains information about the drinks stock of the bar enterprise.

In that case there can be provided an order management system which automatically triggers an order at the brewery or the drinks wholesaler when the stock falls below a minimum level. If the system according to the invention is used in relation to particular events in which the bar locations are formed by specifically installed drinks stands such an order management system can also be used to automatically place further delivery orders with a central stock keeping location. In such drinks stands there is frequently no possible way of selling the drinks required for a day. Therefore it is necessary to provide for replenishment during the event. Stock monitoring can be effected automatically with the system according to the invention so that there is no possibility of the drinks running out at a drinks stand during the event.

The current filling state of the beer barrels connected to the dispensing taps can also be notified to the barkeeper in real time so that he can take action in good time to prepare replacement barrels.

In that respect in a preferred embodiment it is provided that the drinks containers like for example beer barrels, drinks crates or bottles of spirits have information carriers which contain information which can be read out, relating to the content thereof, and there is provided a stock reading-out device with which any drinks containers which have been delivered by the brewery or the drinks wholesaler can be detected. In that case the stock reading-out device is preferably capable of generating a data string from the information carriers and transmitting same to the database. The stock reading-out device can also be used to detect the empty (or unneeded full) drinks containers which are to be taken away again by the brewery or the drinks wholesaler. In that case it should be notified to the stock reading-out device—for example by pushing a button—that the drinks containers are not being delivered but taken away.

In particular when the database allows access to the drinks manufacturer or is even arranged at same the drinks manufacturer learns at a very early time how the current drinks consumption is looking and can possibly adapt his production and/or logistics.

In a further preferred embodiment there is provided a date correlation system which files in the database the value detected by the time detection system and/or the value detected by the quantity detection system together with the date relating to the time of detection or a value linked to said date.

By virtue of that measure it is possible to establish at what times the greatest amount of drinks is consumed and at what times the time required for same is at the least. In addition values which are linked to the date like for example outside temperature or current precipitation can be detected so that it is possible to make predictions how in future drinks consumption will be under given weather conditions.

A self-service bar can also be implemented by means of the system according to the invention. Thus it is for example possible for a glass having an information carrier to be associated with each customer. The customer can then read out the information carrier at the tap, whereby the tap delivers the selected drink in a given amount (generally the amount to fill the glass being used). At the end of the visit to the bar the glass can then be given back and the bill produced.

BRIEF DESCRIPTION OF THE SEVERAL VIEWS OF THE DRAWINGS

Further advantages, features and possible uses of the present invention will be apparent from the description hereinafter of a preferred embodiment and the accompanying FIGURE in which:

FIG. 1 shows a diagrammatic view of an embodiment of a system according to the invention.

DETAILED DESCRIPTION

The core of the system according to the invention is the container 1 which has an information carrier which is preferably fixed to the bottom of the glass and on which are placed a unique and distinct container identification which can be read out, and possibly further items of information. The unique and distinct container identification can be for example a multi-digit number which is assigned only one single time precisely to that glass 1. The additional information can be for example information about the capacity or about the drink which is typically consumed in that glass. In the preferred embodiment the information carrier is an NFC chip.

The system according to the invention is to be implemented in its simplest if, for each drink which can be obtained in the bar, there is a specific glass 1 matched to that drink. In that case it is sufficient for the corresponding information carrier of the glass to be detected by the reading station 2 in order to acquire information as to which drink is sold or dispensed in what amount. If a given form of glass is used for different drinks which are possibly also sold at different prices however it is necessary to communicate to the system what drink and in particular what price is charged to the customer. Input can be effected either by way of suitable input systems or at the reading station 2 or, if the reading station 2 and/or the database are linked to a digital till system 6, they can be input by way of the till system 6. The system according to the invention can either have an interface for connection to external till systems or it can have its own till system.

Embodiments are also conceivable in which such an input has to be effected only when the glass 1, instead of the drink intended for the glass 1, is used for another drink. If for example instead of a Pils beer, a customer orders a so-called "Radler" shandy consisting of a mixture of beer and lemonade then, before the drinking glass 1 is detected by the reading station 2, the system could be notified by way of the till system 6 that the glass 1 which is now to be detected contains not beer but Radler.

In the illustrated example the database 4 is a central server which can be positioned at any desired location world-wide. That server moreover can also be linked not only to the reading stations 2 of a given bar, but can acquire data from all bars world-wide which use the system according to the invention. In the illustrated example the link between the reading station 2 and the database 4 is by means of a mobile radio link which ensures that stable data transmission is possible even in the event of a poor Internet connection. The data stored in the database 4 can be evaluated with a data mining system 5 in order for example to obtain information about the drinking behaviour of the customers.

In that respect national and international regulations about data protection are self-evidently to be observed.

The system can contain a plurality of reading stations 2. Thus on the one hand reading stations 2 can be provided at the bar, in particular integrated in the bar counter, so that the barkeeper only has to put the ordered and prepared drinks down on the reading stations 2. Alternatively or in combination it is also possible to integrate corresponding reading stations 2 in tablets which are provided so that a waiting staff member can take the drinks arranged on the tablet to a table at which the customers are waiting, who ordered the corresponding drinks.

Finally reading stations 2 can also be arranged at or in the customer table. In that case both integration into the table top and also the provision of reading devices serving as a drinks coaster is possible. All the reading stations 2 described hereinbefore essentially serve to document delivery of the prepared drink.

In addition a second reading station can be arranged at a return station, for example a special area on the counter, at which the empty glasses are collected. Each empty glass 1 is detected at that reading station 2.

In addition a reading station 2 for NFC chips can be provided, which identify the customer. That can be effected for example by way of the smartphone 3 of the customer or by way of identity cards or credit cards presented by the customer.

Alternatively the bar operator could also give his customers individual chips or ID cards with a corresponding chip, for example against a deposit, with which the corresponding customer can be identified. At each order the corresponding ID chip of the customer is read out and the order is linked to the identity of the customer. Basically therefore the smartphone 3, the credit card, the identity card or the ID card supplied functions as a digital beer mat. At the end of the time spent in the bar the customer can then pay his bill. Alternatively it is also possible that the credit card or the mobile payment function of the smartphone 3 is already loaded with delivery of the drink, which represents a simplification for the customer as, at the end of the stay in the bar, it is no longer necessary to wait for the bill, and it is also a simplification for the bar operator as on the one hand bill-dodging is a thing of the past and on the other hand the payment operation which is intensive at present is eliminated.

In the same way a deposit can be debited to the customer and credited back again as soon as a corresponding glass 1 has been identified at the first or the second reading device.

LIST OF REFERENCES

1 container, glass
2 reading station
3 smartphone
4 database
5 data mining system
6 till system
7 mobile payment

The invention claimed is:
1. A system comprising:
a) a plurality of drinks containers each drinks container having an information carrier which contains a unique and distinct container identification which can be read out,
b) a first reading device for reading out container identifications from information carriers and for generating a data string on the basis of the read-out container identification,
c) a database for storing the data string in a database entry, and
d) a control device which causes transmission of the generated data string to the database,
wherein the system is arranged such that the database entry is generated when an open order of a drink is generated,
the open order is selectable by a barkeeper to prepare the drink,
a drink container identification of one of the plurality of drinks containers is detectable with the first reading device,
the database entry with the open order is supplemented by the container identification,
and a status value of the database entry with the open order is altered.

2. A system according to claim 1 characterised in that there is provided a second reading device for reading out information carriers and for generating the data string on the basis of the read-out container identification, wherein both the first reading device and also the second reading device are so adapted that they add an item of status information to the data string, wherein the status information has the same status for all data strings generated by the first reading device or the second reading device, wherein the status of the status information generated by the second reading device differs from the status of the status information generated by the first reading device.

3. A system according to claim 2 characterised in that the control device stores the generated data string in the database only when there is still no database entry having the same container identification and the same status.

4. A system according to claim 1 characterised in that the first reading device and/or the database is or can be connected to a till system in order to at least partially transmit the data string to the till system or to receive data strings from the till system.

5. A system according to claim 1 characterised in that the database is arranged remote from the first reading device, wherein the database and the first reading device are connected together by way of a data link, wherein the data link is preferably wireless.

6. A system according to claim 5 wherein data link is in a form of a mobile radio link.

7. A system according to claim 1 characterised in that the information carriers are radio frequency identification tags.

8. A system according to claim 7 wherein the information carriers are near field communication tags.

9. A system according to claim 1 characterised in that there is provided a computer program which can be loaded on to a smartphone and which when run on the smartphone can read container identifications out of information carriers, wherein preferably the computer program produces a link to the database and transmits data string released by the user of the smartphone to the database.

10. A system according to claim 1 characterised in that there is provided a customer reading device for reading in radio frequency identification tags or near field communication chips which identify people.

11. A system according to claim 10 characterised in that there is provided a deposit management system which provides that both the drinks container identification is read out with the first reading device and also a customer identification is read out with the customer reading device, the database entry is generated which associates a deposit allocated to an identified drinks container with the customer identification and, as soon as the second reading device thereafter reads out an identical drinks container identification, the association between the customer identification and the deposit allocated to the identified drinks container is extinguished.

12. A system according to claim 10 wherein there is provided the device for reading in near field communication chips of smartphones.

13. A system according to claim 1 characterised in that there is provided a use management system which associates with each detected drinks container identification to a value which is calculated on the basis of the number of detections of said drinks container identification by the first reading device and files the value in the database.

14. A system according to claim 1 characterised in that there is provided a time detection system which detects a time which has elapsed between the detection of the same drinks container identification by two different reading devices and files that time or a value calculated from that time in the database.

15. A system according to claim 14 characterised in that there is provided a date correlation system which files in the database the value detected by the time detection system and/or a value detected by a quantity detection system together with a date relating to a time of detection or a value linked to said date.

16. A system according to claim 1 characterised in that there is provided a quantity detection system which determines a number of detections of drinks container identifications and files the determined number possibly with further data string in the database.

17. A system according to claim 16 characterised in that there is provided an order management system which on a basis of a detected consumption quantity determines whether produce to be consumed has to be ordered and preferably automatically implements an order for a required produce.

18. A system according to claim 17 characterised in that the reading device has a marking which marks a reading region of the first reading device.

19. A system according to claim 18, wherein the marking is a light marking.

20. A system according to claim 19 wherein the light marking temporarily changes a color of the light marking after a successful reading-out operation.

21. A system according to claim 1 characterised in that the first reading device has a flat surface for setting down the drink container.

* * * * *